May 30, 1933. J. M. DEEN 1,911,677
LUGGAGE CARRIER
Filed June 11, 1930 2 Sheets-Sheet 1

Inventor
J. M. Deen
By Lacey & Lacey,
Attorney

May 30, 1933. J. M. DEEN 1,911,677
LUGGAGE CARRIER
Filed June 11, 1930 2 Sheets-Sheet 2
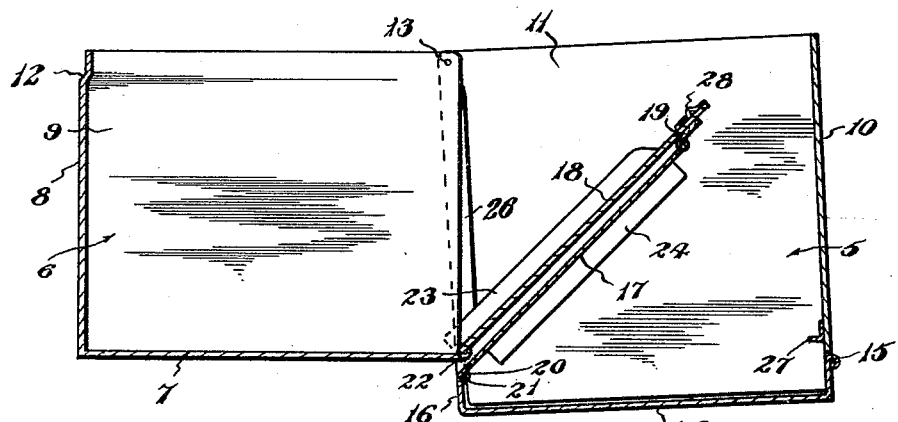
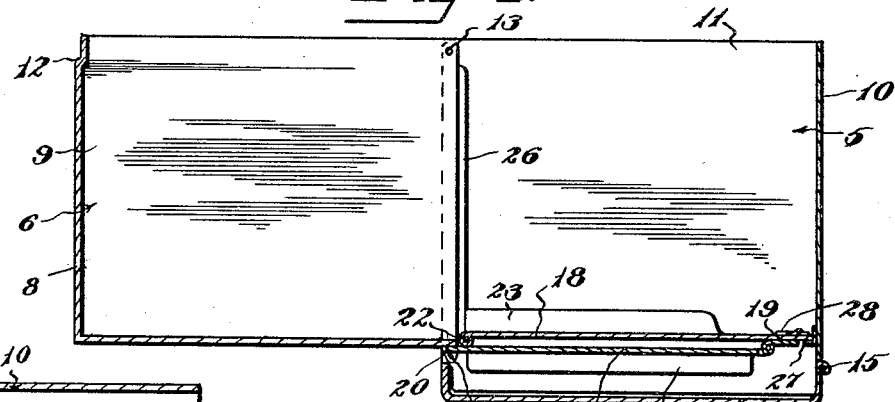
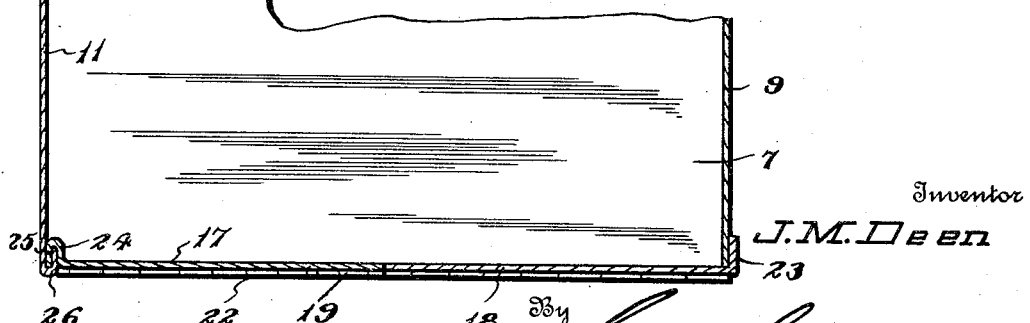

Patented May 30, 1933

1,911,677

UNITED STATES PATENT OFFICE

JAMES M. DEEN, OF HARLAN, IOWA

LUGGAGE CARRIER

Application filed June 11, 1930. Serial No. 460,474.

This invention relates to luggage carriers and more particularly to a luggage carrier of the trunk type adapted to be mounted upon a support at the rear of an automobile.

One object of the invention is to provide a luggage carrier of this type so constructed that it may be converted from a relatively deep receptacle having its open upper end closed by a cover to a receptacle of less depth but greater bottom area. By this arrangement the luggage carrier may be adjusted to accommodate itself to the type and quantity of articles which it is desired to transport.

Another object of the invention is to provide upper and lower sections of the receptacle with rear walls so mounted that when the upper section is swung downwardly to a lowered position the rear walls will also be swung downwardly into such position that they form a bottom for the lowered upper section and by so doing eliminate a partition which would otherwise extend between the two sections. By this arrangement the interior of the receptacle will be entirely unobstructed when the upper section is swung downwardly and thereby permit bulky objects to be placed in the carrier.

Another object of the invention is to so connect the rear walls of the upper and lower sections with each other that when the upper section is swung downwardly and the rear walls are swung downwardly with the upper section, the upper section cannot move upwardly without grasping a handhold or handle carried by the rear wall of the lower section and drawing the rear walls upwardly. It will thus be seen that the walls when lowered will serve as means to firmly hold the upper section lowered.

Another object of the invention is to so form the rear walls that when the upper section is in a raised position tight joints will be formed between the rear walls and side walls of the sections.

Another object of the invention is to provide a device of this character which is simple in construction and may have its upper section very easily moved to a raised or lowered position according to the uses to which the carrier is to be put.

The invention is illustrated in the accompanying drawings, wherein

Fig. 3 is a sectional view showing the upper section partially swung to a lowered position, Fig. 4 is a similar view showing the upper section and rear walls in the lowered position, and Fig. 5 is a sectional view taken on the line 5—5 of Fig. 1.

Figure 1:
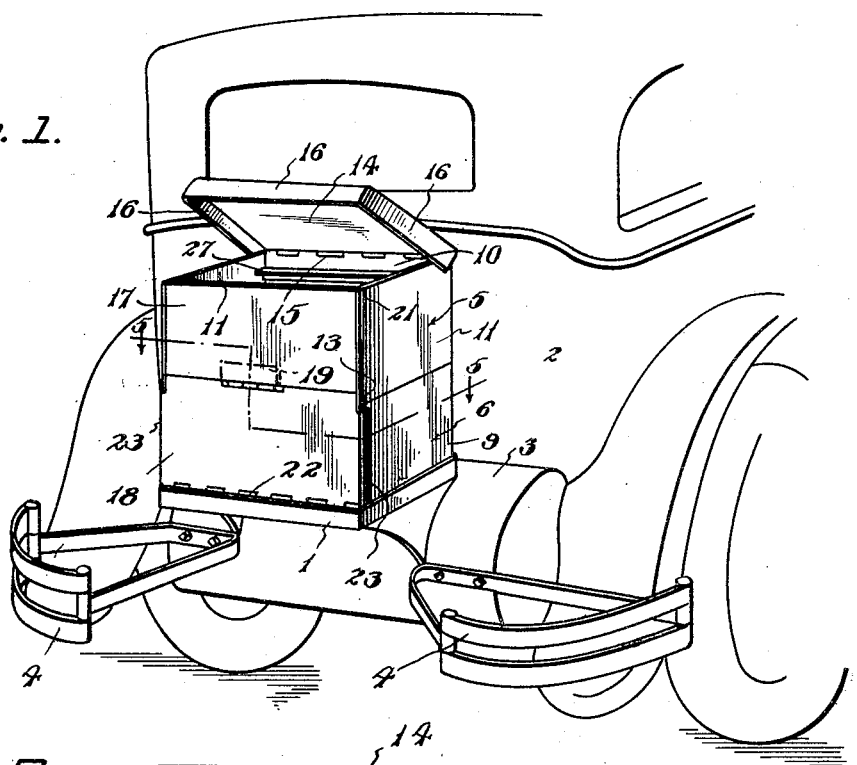
Figure 1 is a perspective view showing the rear portion of an automobile with the improved luggage carrier mounted upon a support projecting rearwardly from the automobile.

The improved luggage carrier is of the trunk type and when in use is secured upon a platform or support 1 mounted at the rear of an automobile 2, and in the present illustration the platform or support 1 is in such position that the luggage carrier will be supported above the gas tank 3 where it will be shielded from damage by the rear bumpers 4. It will be understood that the dimensions may be varied but that the luggage carrier will preferably be oblong in shape transversely of the automobile when viewed in top plan.

The luggage carrier consists of a receptacle having upper and lower sections 5 and 6 and may be secured upon the platform or support 1 by bolts passed through the bottom 7 of the lower section and through the support, but it will be understood that it may be secured to the support in any desired manner. The lower section is open at its top and has a front wall 8 and side or end walls 9. The upper section is open at both its top and bottom and has a front wall 10 and side or end walls 11. It should be noted that the upper portions of the front and side walls of the lower section are crimped inwardly in order to permit the upper section to fit about the upper portion of the lower section and in addition form a shoulder 12 spaced from the upper edges of the front and side walls of the lower section to limit movement of the lower section into the upper section and support the upper section in the position shown in Figure 2. Fasteners, such as rivets 13, are passed through the overlapped rear corner portions of the side or end walls of the upper and lower sections in order to pivotally mount the upper section and permit it to be swung from the elevated position shown in Figures 1 and 2 to the lowered position shown in Figs. 3 and 4. A cover 14 is provided as a closure for the open upper end of the upper section and this cover is hinged to the front wall 10 for the full width thereof, as shown at 15, and formed with flanges 16 to fit snugly about the upper section and form a tight closure when the cover is shut. A lock or other suitable means may be provided in order to secure the cover when closed.

Figure 2:
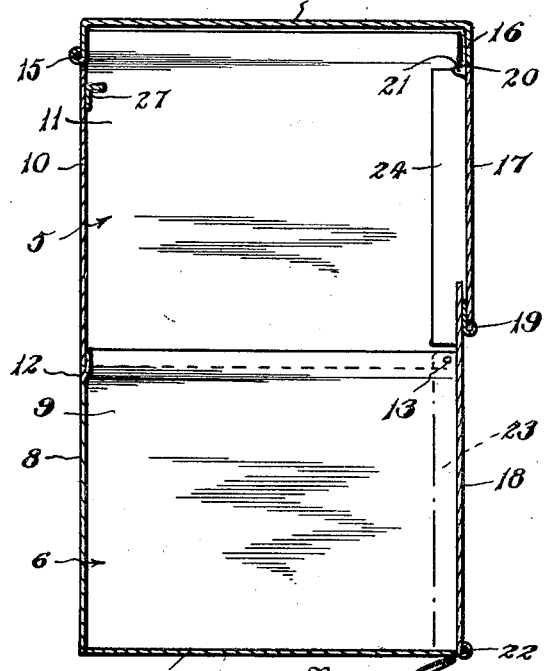
Fig. 2 is a vertical sectional view through the luggage carrier with the upper section in the position shown in Fig. 1.

The rear walls 17 and 18 of the upper and lower sections have their adjoining edge portions overlapped, as clearly shown in Figure 2, with the upper portion of the lower wall extending upwardly above the lower edge of the upper wall to bear against the inner face thereof and are pivotally connected by a hinge 19 provided intermediate the width of these walls. Hinge ears 20 project inwardly from the upper rear wall 17 to receive rivets or equivalent fasteners 21 passed through the upper rear corners of the side walls 11 of the upper section in order to pivotally connect the rear wall of the upper section with the side or end walls thereof and the rear wall 18 of the lower section is hinged to the rear edge of the bottom 7 for the full width thereof, as shown at 22. The hinges 15 and 22 are preferably similar to those used for piano tops and similar purposes, but it will be understood that any type of hinge may be employed and also that any suitable type of hinge may be used to pivotally connect the lower edge of the upper wall 17 with the lower wall 18. Side portions of the lower wall are bent to form flanges 23 which overlap the outer surfaces of the end walls 9 to form a tight closure between the end and rear walls of the lower section. Between the tongues 20 and its lower edge, the upper wall 17 has its side portions bent inwardly, as shown at 24, and then outwardly, as shown at 25, to form tongues and pockets and the rear portions of the side or end walls 11 are bent inwardly to form tongues 26 which engage in the pockets of the rear wall in interlocked engagement with the tongues 25, as clearly shown in Figure 5, and form a tight joint between the rear wall and side or end walls of the upper section. Therefore, when the upper section is in a raised position, tight joints will be formed between the rear walls and side walls of the two sections in order to prevent fine material from sifting outwardly. It should also be noted that since the rear wall of the upper section has interlocked engagement with the tongues of the side walls the rear wall will be prevented from being bulged outwardly and will be retained in a vertical position.

When this luggage carrier is in use, it is placed upon the support or platform 1 where it is firmly secured by bolts or equivalent fasteners and when the upper section is in the raised position shown in Figures 1 and 2, the cover 14 may be raised and access had to the interior of the receptacle. When in this position, tall packages and other articles which should be shielded from the weather may be placed in the receptacle and the cover then closed. When it is desired to transport bulky articles which cannot be conveniently placed in a luggage carrier of the dimensions shown in Figures 1 and 2, the upper section is swung rearwardly from the raised position shown in Figures 1 and 2 to the lower position shown in Figure 4. As the upper section is swung rearwardly. its rear wall 17 swings downwardly with it and the rear wall of the lower section will be drawn rearwardly and downwardly by the rear wall of the upper section as shown in Figure 3 until the upper section has been swung to the completely lowered position shown in Figure 4. When the upper section is in the fully lowered position, the two rear walls are disposed substantially in face to face engagement with each other with the portion of the wall 18 which overlaps the inner face of the upper wall when raised projecting from the hinged edge of the upper wall and resting upon a support 27 carried by the front wall 10 of the upper section. This support consists of a strip of angle metal firmly secured against the inner face of said front wall 10 in spaced relation to the upper edge thereof. By an inspection of Figure 4, it will be seen that when the upper section is in the lowered position the rear walls form a strong bottom for this section upon which heavy articles may be placed instead of resting upon the cover 14. It should also be noted that when the upper section is in the lowered position the folded rear walls will prevent the upper section from being swung upwardly until the handle 28 carried by the wall 18 is grasped and the wall 18 drawn upwardly. Therefore, jolts received when traveling over rough roads cannot cause the rear section to be jolted out of its proper position. In view of the fact that the rear walls swing downwardly to the position shown in Figure 4, a partition between the two sections will be eliminated thereby providing the receptacle with an unobstructed interior and permitting bulky articles to be easily placed in the luggage carrier. A cover of canvas, oilcloth or any other suitable material may be provided for use in order to protect articles placed in the luggage carrier when the sections are lowered, if so desired.

Having thus described the invention, I claim:

1. A luggage carrier comprising upper and lower sections, a cover for said upper section movable into and out of a closed position, the upper section being pivoted to the lower section for movement from a position above the lower section to a lowered position and when lowered forming a horizontal continuation of the lower section, rear walls of said sections being movable into position to form a bottom for the upper section when the upper section is in a lowered position and provide an unobstructed interior for the carrier.

2. A luggage carrier comprising upper and lower sections, a cover for said upper section movable into and out of a closed position, the upper section being pivoted to the lower section for movement from a position above the lower section to a lowered position rearwardly thereof, said carrier being open at its top when the upper section is lowered, rear walls of said sections being pivotally mounted and having their adjoining edges pivotally connected whereby the said rear walls may swing downwardly one upon the other into position to form a bottom for the upper section when the upper section is lowered.

3. A luggage carrier comprising upper and lower sections, a cover for said upper section movable into and out of a closed position, the upper section being pivoted to the lower section for movement from a position above the lower section to a lowered position rearwardly thereof, said carrier being open at its top when the upper section is lowered, the rear wall of the upper section being pivotally connected with upper rear corners of end walls of the upper section and the rear wall of the lower section being pivotally connected with lower rear corners of end walls of the lower section, said rear walls having adjoining edge portions pivotally connected whereby the said rear walls may swing downwardly one upon the other into position to form a bottom for the upper section when the upper section is lowered.

4. A luggage carrier comprising upper and lower sections, a cover for said upper section movable into and out of a closed position, the upper section being pivoted to the lower section for movement from a position above the lower section to a lowered position rearwardly thereof, said carrier being open at its top when the upper section is lowered, the rear wall of the upper section being pivotally connected with upper rear corners of end walls of the upper section and the rear wall of the lower section being pivotally connected with lower rear corners of end walls of the lower section, a support carried by the upper section, the rear wall of the upper section having its lower edge portion overlapping the outer face of the upper portion of the rear wall of the lower section and pivoted thereto in spaced relation to the upper edge thereof whereby when the upper section is swung to a lowered position and the rear walls swung downwardly to form a bottom for the lowered upper section the rear wall of the lower section projects from the rear wall of the upper section to rest upon the support carried by the upper section and the rear wall of the upper section engages beneath the bottom of the lower section to secure the upper section in its lowered position.

5. A luggage carrier comprising upper and lower sections, a cover for said upper section movable into and out of a closed position, the upper section being pivoted to the lower section for movement from a position above the lower section to a lowered position rearwardly thereof, said carrier being open at its top when the upper section is lowered, rear walls of said sections being pivotally mounted and having their adjoining edges pivotally connected whereby the said rear walls may swing downwardly one upon the other into position to form a bottom for the upper section when the upper section is lowered, the rear wall of the upper section when lowered engaging under the bottom of the lower section to secure the upper section in its lowered position.

6. A luggage carrier comprising upper and lower sections, a cover for said upper section movable into and out of a closed position, the upper section being pivoted to the lower section for movement from a position above the lower section to a lowered position and when lowered forming a horizontal continuation of the lower section, rear walls of said sections being pivoted to end walls of their respective sections and pivoted to each other whereby the rear walls may be swung downwardly with the upper section one against the other and form a bottom for the lowered upper section and eliminate a partition between the sections.

7. A luggage carrier comprising upper and lower sections, a cover for said upper section movable into and out of a closed position, the upper section being pivoted to the lower section for movement from a position above the lower section to a lowered position and when lowered forming a horizontal continuation of the lower section, rear walls of said sections being pivoted to end walls of their respective sections and pivoted to each other whereby the rear walls may be swung downwardly with the upper section one against the other and form a bottom for the lowered upper section and eliminate a partition between the sections, flanges being formed at ends of the rear walls to engage end walls of the sections and form tight joints between the rear and end walls when the upper section is in an elevated position.

8. A luggage carrier comprising upper and lower sections, a cover for said upper section movable into and out of a closed position, the upper section being pivoted to the lower section for movement from a position above the lower section to a lowered position and when lowered forming a horizontal continuation of the lower section, rear walls of said sections being pivoted to end walls of their respective sections and pivoted to each other whereby the rear walls may be swung downwardly with the upper section one against the other and form a bottom for the lowered upper section and eliminate a partition between the sections, flanges being formed at ends of the rear wall of the lower section to overlap outer faces of end walls of the lower section and the upper section having its rear wall and end walls formed with tongues interlocking when the upper section is in an elevated position to form a tight joint and prevent the rear wall from bulging outwardly.

9. A luggage carrier comprising upper and lower sections, the upper section being pivoted to the lower section whereby it may assume a position above the lower section forming an upward elongation thereof or a position at the rear of the lower section forming a rearward continuation thereof, the rear walls of said sections being pivotally connected whereby they will fold into position to form a bottom for the upper section when the upper section is in a lowered position and provide communication between the sections.

10. A receptacle comprising pivotally connected companion sections whereby one section may be disposed above or at the rear of the other section and having folding walls connected to each other and to the respective sections whereby to form closures for the sections when the sections are arranged one above another and form a bottom for the rear section when one section is disposed at the rear of another.

11. A receptacle comprising pivotally connected companion sections movable relative to each other to positions one above another or one behind another, the rear walls of the sections being pivoted to each other and to the respective sections and arranged to overlap the pivot points whereby when the sections are arranged one behind another said walls will fold into facing position to form a bottom for one section and engage beneath the other section to retain the sections in the set position.

12. In an extensible trunk of the character disclosed, a stationary section, including side walls, a bottom wall and a back wall and a movable section above said stationary section including side walls, a top wall and a back wall, the lower rear corners of the side walls of said movable section being pivoted to the upper rear corners of the side walls of said stationary section, whereby the movable section may be moved from position above the stationary section to a position forming an extension thereof.

13. In an extensible trunk of the character disclosed, a stationary section, including side walls, a bottom wall and a back wall and a movable section above said stationary section including side walls, a top wall and a back wall, the side walls of said movable section being pivoted to the side walls of said stationary section, whereby the movable section may be moved from position above the stationary section to a position forming an extension thereof, the back wall of the stationary section being hinged to said bottom wall and the back wall of the movable section being hinged to the back wall of the stationary section, whereby the back wall of the stationary section forms an extension of said bottom wall when the trunk is in extended position, and the back wall of the movable section folds beneath the back wall of the stationary section.

In testimony whereof I affix my signature.

JAMES M. DEEN.